United States Patent

[11] 3,627,908

[72] Inventor John L. Dailey
Pittsford, N.Y.
[21] Appl. No. 887,636
[22] Filed Dec. 23, 1969
[45] Patented Dec. 14, 1971
[73] Assignee Xerox Corporation
Rochester, N.Y.

[54] HIGH-SPEED COLOR CORRECTING SCANNER FOR MAKING COLOR PRINTING PLATES
7 Claims, 5 Drawing Figs.

[52] U.S. Cl. .......... 178/5.2 A, 250/217 CR, 355/32, 355/37
[51] Int. Cl. .......... H04n 1/46
[50] Field of Search .......... 355/32, 37; 178/5.2 A; 250/217 CR

[56] References Cited

UNITED STATES PATENTS

| | | | |
|---|---|---|---|
| 3,288,925 | 11/1966 | Moe | 355/32 X |
| 3,296,368 | 1/1967 | Lohmann | 250/217 CRTX |
| 3,557,303 | 1/1971 | Jordan | 178/5.2 A |
| 3,194,882 | 7/1965 | Hall | 178/5.2 A |
| 3,417,196 | 12/1968 | Dreyfoos | 178/5.2 A |
| 2,879,326 | 3/1959 | Yule | 178/5.2 A |
| 3,555,262 | 1/1971 | Shimada | 178/5.2 A X |

*Primary Examiner*—Samuel S. Matthews
*Assistant Examiner*—Michael Harris
*Attorneys*—James J. Ralabate, Donald F. Daley, Thomas J. Wall and Marn and Jangarathis

ABSTRACT: A high-speed color correcting scanner, comprising a mirror and a multicolor pattern including red, green and blue colors mounted on a rotating mandrel for illuminating successively different spots of the pattern to reflect multicolor light therefrom; three discrete light filter and photocell means for translating the reflected red, green and blue light into three corresponding voltages varying in magnitude in response to the varying intensity of the respective latter light; a plurality of photosensitive printing plates mounted on the rotating mandrel; a plurality of sources of actinic light; a plurality of light modulators connected to the light sources; a transform analog computer embodying cathode ray tubes and light transparency encoded films activated by light from the latter tubes to generate other voltages for simultaneously actuating the light modulators to direct corresponding amounts of actinic light from the respective light sources onto the light-sensitive printing plates to image precisely the multicolor pattern thereon; and on optical device including two light-beam splitters and interposed between the multicolor pattern and the filter means for splitting the reflected multicolor light into three discrete light beams for voltage translation by the filter and photocell means into the three corresponding voltages; the mirror, mandrel, light sources, modulators and optical device moving in synchronism.

Figure 3:
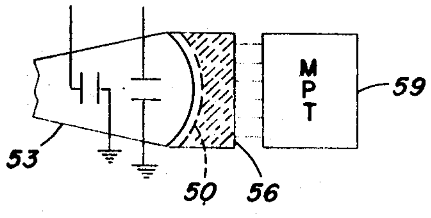

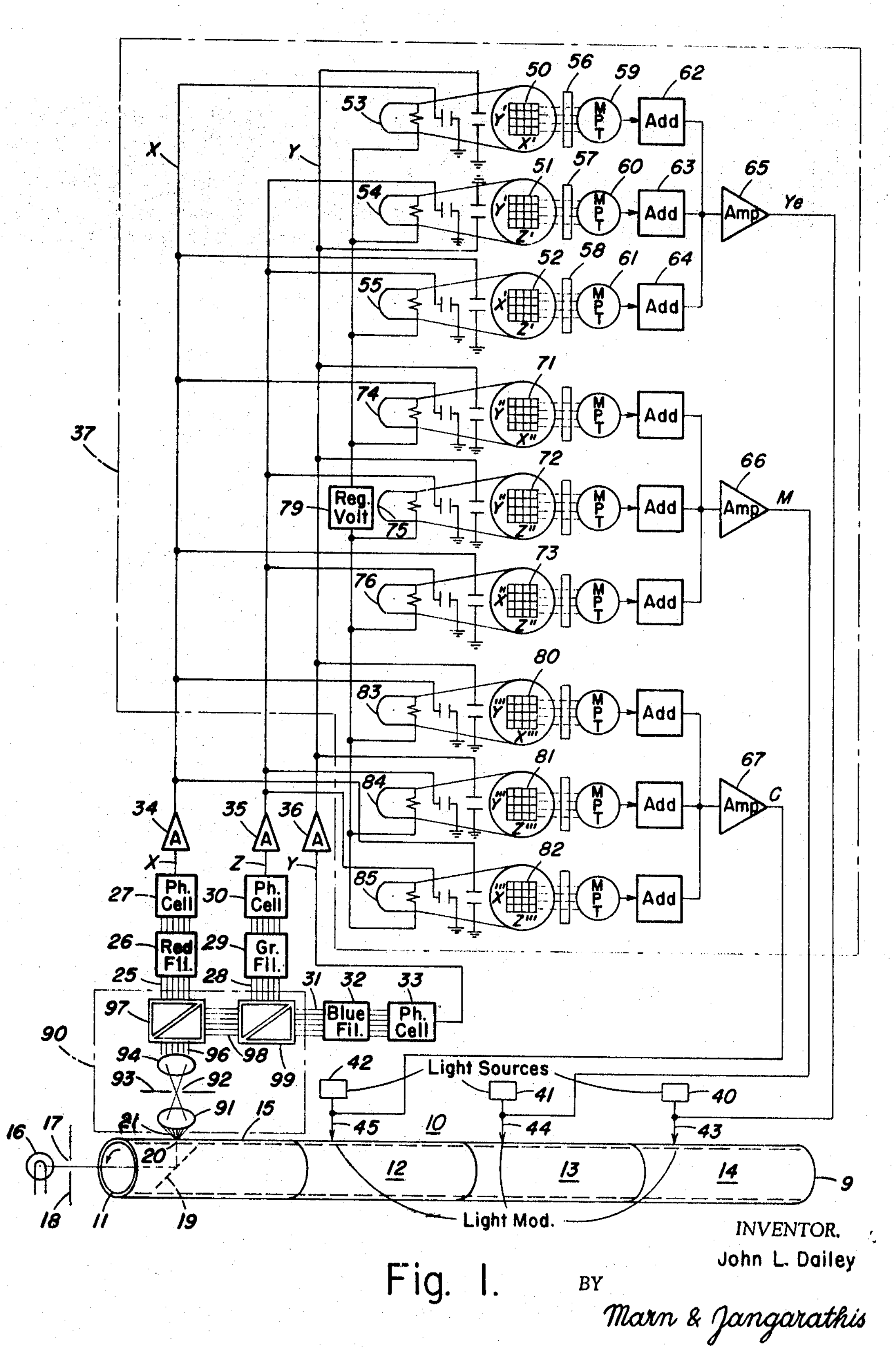
Fig. I.
INVENTOR.
John L. Dailey
BY
Marn & Jangarathis
ATTORNEYS

INVENTOR.
John L. Dailey
BY
Marn & Jangarathis
ATTORNEYS

HIGH-SPEED COLOR CORRECTING SCANNER FOR MAKING COLOR PRINTING PLATES

This invention relates to a high-speed color correcting apparatus for making multicolor printing plates, and more specifically to such apparatus embodying an optical scanner having light-beam splitters.

The color printing art is heretofore aware of a technique for exposing a multicolor transparency through red, green and blue light filters, successively, to make three continuous tone negatives. The latter are then exposed to three plates behind a halftone screen to make three halftone positives. These are projected onto printing plates coated with a photoresist and acid etched to produce the final plates. This technique involves nine separate exposures, produces a low-quality color, and depends a great deal on the skill of the technician. It is used in newspaper advertising, broadsheets, and other applications where cost is more important than quality.

The chief reason for the low quality in the unmasked technique is inferior color separation both in the plate making and the printing process. Unless dichroic filters are used, the red filter transmits a certain fraction of blue and green light during the original exposures, and during the printing process the cyan ink, supposed to reflect only green and blue light, reflects a certain amount of red light. Masking operations attempt to compensate for the undesired red light reflection. Before the color separation negatives are made, three color separation positives made on black and white film at low gamma are placed in register, one-by-one, over the original color pattern while the separation negatives are made. The positive mask, or combination of masks, used in the making of the separations, and the density to which the masks are developed relative to the original, depend on the individual spectral absorption curves of the inks used in printing. The theory in masking is an attempt to introduce an error which is equal in magnitude but opposite in sign to an error that already exists.

Electronic color scanner equipment is also heretofore known in the color printing art for providing color reproductions of the highest quality. This includes the use of spectral filters and photocells for translating red, green and blue light into corresponding voltages varying in magnitude in accordance with the intensity variations of the latter light. The equipment operates on the basis that the hue, saturation and density of an illuminated multicolor spot being analyzed are completely defined by the voltage translations provided by the photocells, and that the amount of cyan, magenta and yellow ink that must be mixed to duplicate the color exactly may be mathematically calculated. The voltage processing circuits are so predetermined that they are in effect an analog computer for solving the proportions of the three inks required for a precise color duplication. The outputs of the computer circuits are four discrete voltages which drive four light modulators, varying the intensity of the spots of light that are scanning four sheets of photographic film. After development, the four films provide four precise color images and are thereafter used to make three color printing plates in the familiar manner. This processing has been found to vary in quality from one equipment to another.

Although the electronic scanner equipment of the prior art produces high quality color reproduction, it has the one disadvantage of being so costly as to be substantially priced out of the ordinary commercial market where short press runs (i.e., relatively small numbers of the ultimate product) are involved. Where cost is not a controlling factor in the production of the ultimate product, regardless of the number thereof, the electronic scanner has found some use. A second disadvantage of the electronic scanner is the time required to make the color printing plates. A typical scanning time for an 8-inch by 10-inch photograph is 1 hour. After this, there remain the steps of halftone screening, plate etching, etc. One three-color process using the electronic color correcting equipment involves of the order of 28 exposures in the making of a set of three-color printing plates. This consumes a large amount of technician time which is also expensive from a monetary standpoint.

The present invention concerns an electronic color correcting scanner for making multicolor printing plates at substantially reduced costs in terms of money and time.

A principal object of the invention is to provide an improved electronic color correcting scanner for making color printing plates.

Another object is to reduce the cost of making color printing plates.

A further object is to reduce the time involved in the making of color printing plates.

An additional object is to improve the quality of color reproductions.

Still another object is to make color printing plates in a single operating cycle.

A still further object is to remove technician judgment from the making of color printing plates.

Another object is to minimize technician skill in the making of color printing plates.

A further object is to minimize required technician experience in the making of color printing plates.

In combination with a high-speed color correcting scanner for use in color printing, comprising: a multicolor pattern including at least red, green and blue colors; a plurality of light-sensitive printing plates; a rotatable mandrel peripherally mounting the pattern and printing plates in side-by-side relation thereon in such manner that the mandrel includes a transparent section on which the pattern is mounted; a mirror mounted interiorly of the mandrel and movable therewith in proximity of the pattern for illuminating successively different spots thereof to reflect red, green and blue lights therefrom as the mandrel is rotated; light filter and photocell means for selectively translating the red, green and blue lights into three corresponding voltages, each varying in magnitude in response to the intensity variation of one of the reflected red, green and blue lights; three sources of actinic light; three light modulators connected to the three light sources and actuable to different amounts of transmission to pass varying amounts of the respective lights onto the photosensitive printing plates; and a transform analog computer simultaneously generating three other voltages varying in magnitudes for actuating the three light modulators at the same time to direct the lights of the light sources onto the light-sensitive printing plates to produce an image of the multicolor pattern thereon, the computer consisting of three groups of three films encoded with different degrees of light transparencies, each film containing a plurality of equal areas arranged in coordinate form, the areas of first, second and third films in each group encoded with the predetermined degrees of light transparencies in accordance with three preselected different combinations of two coordinate voltages included in three further voltages; three groups of cathode-ray tubes, each group consisting of three of the latter tubes, each tube group utilizing three different combinations of two of the three translated voltages and one of the film groups encoded with the predetermined degrees of light transparencies to generate one of the other voltages; a specific embodiment of the present invention includes movable optical means having a plurality of light-beam splitters for splitting the reflected multicolor light into three discrete beams for application to the light filter and photocell means; the mirror, mandrel, light sources modulators and optical means moving in synchronism.

Figures 2A, 2B, 2C:
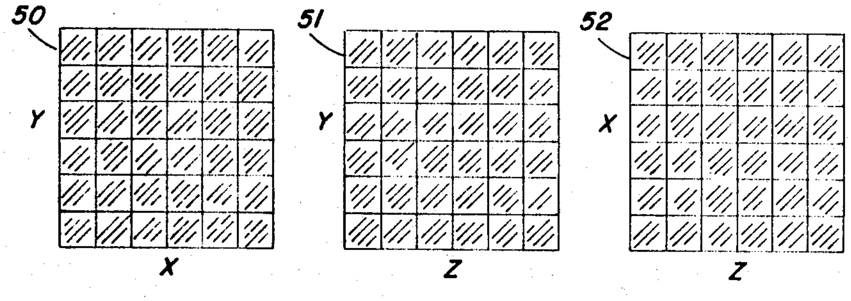

The invention is readily understood from the following description taken together with the accompanying drawing in which:

FIG. 1 is a circuit diagram of a color correcting scanner designed for color printing and embodying a specific form of the invention;

FIGS. 2A, B and C form a group of films encoded with predetermined degrees of light transparencies and usable in FIG. 1; and FIG. 3 is a fragmentary side elevational open view of one cathode-ray tube having one of the transparency encoded films of FIGS. 2A, B and C mounted on a screen thereof and utilized in FIG. 1.

A rotatable cylindrical mandrel 10 comprises, for example, a hollow transparent end section 11 and an opposite end section 9 peripherally supporting printing plates 12, 13 and 14 disposed in side-by-side relation and having light-sensitive surfaces suitably prepared to be exposed to different intensities of actinic lights for a purpose and in a manner later explained. Each of the plates is initially cut to the size of a standard multilith plate as used in the printing art. A transparent object 15 containing a multicolor pattern for translation into a multicolor image in a manner hereinafter mentioned is positioned on the periphery of the transparent mandrel end section 11. A lamp 16 transmits colorless light through an aperture 17 formed in an opaque member 18 and serving to apply a beam of the latter light onto a movable mirror 19 suitably mounted interiorly of the hollow mandrel section. The mirror is so angularly disposed relative to the lamp as to position a light spot 20 onto the object pattern which is thereby illuminated to reflect multicolor light from the illuminated spot into area 21 at a given moment. It is understood that in response to synchronous movements of the mandrel and mirror, successively different spots on the object pattern are illuminated at successively different times until the entire object pattern has been so illuminated for the purpose subsequently explained.

Assuming, for example, the reflected multicolor light includes at least red, green and blue lights of varying intensities (representing hue, saturation and density), then a light-beam component 25 of multicolor parallel-ray light formed in a manner later pointed out is applied to the input of a spectral red light filter 26 which selects the red light from the latter light beam. This red light supplied to an input of a photocell 27 is translated thereby into an electric voltage X varying in magnitude in correspondence with the filtered red light variations of intensity. Similarly, a light beam component 28 of multicolor parallel-ray light produced in a manner later indicated is applied to the input of a spectral green light filter 29 which selects the green light from the latter light beam. This green light supplied to an input of photocell 30 is translated thereby into an electric voltage Z varying in magnitude in correspondence with the filtered green light variations of intensity. Also, a light beam component 31 of multicolor parallel-ray light provided in a manner hereinafter identified is applied to an input of a spectral blue light filter 32 which selects the blue light from the latter beam. This blue light applied to an input of photocell 33 is translated thereby into an electric voltage Y varying in magnitude in correspondence with the filtered blue light variations of intensity.

The voltages X, Y and Z amplified in amplifiers 34, 35 and 36, respectively, are utilized in a transform analog computer 37 designed to solve a color mixing problem in a way that is presently described. Incidentally, the amplifiers are initially adjusted to exhibit equal gain characteristics by placing identical gray cards, not shown, in the light areas 25, 28 and 31 to cut off the multicolor light therein while at the same time adjusting the gain characteristics of the respective amplifiers as required until the simultaneous outputs thereof are indicated as equal. Upon the completion of such adjustment, the gray cards are removed.

In response to the input voltages X, Y and Z, the computer generates output voltages Y*e*, M and C varying in magnitude for reasons subsequently explained. These voltages are applied to light modulators 43, 44 and 45, respectively, which have first corresponding ends connected to sources 40, 41 and 42, of actinic light. The several light modulators have other corresponding ends disposed in engagement with or in proximity of the respective printing plate surfaces. The modulators are understood to be adjustable by the varying magnitude voltages Y*e*, M and C to greater or lesser openings for simultaneously exposing the light-sensitive surfaces of the respective printing plates 14, 13 and 12 to corresponding amounts of the actinic light to produce thereon a precise image of the multicolor pattern via the reflected multicolor light effective at the illuminated spot 20 at a given time. When the controlled amounts of the actinic light via the modulators strike the light-sensitive printing plate surfaces, a continuous multicolor image is provided thereon. When contact type halftone screens are disposed in engagement with the printing plate surfaces, a dot-form image is effectuated on the printing plate surfaces. It is understood that the actuation of the modulators may be controlled by the usual threshold voltage magnitude. The arrangement of the light sources and modulators is well known in the art and is mentioned here in its simplest form to simplify the description.

As the design and operation of the computer are disclosed in detail in my copending application, Ser. No. 887,627 filed Dec. 23, 1969 on even date herewith, they are only briefly mentioned here. Let is be supposed for the purpose of the instant explanation that the color spectrum of the multicolor pattern on the object 15 is divided into three regions designated red, green and blue. Then, three printing inks selected, for example, as cyan, magenta and yellow are measured in the three regions in accordance with a well-known technique for red, green and blue reflectivities with the following results:

cyan = 0.60 blue + 0.51 green + 0.06 red
magenta = 0.46 blue + 0.09 green + 0.68 red
yellow = 0.03 blue + 0.62 green + 0.61 red Now, the problem to be solves is to find the combination of cyan, magenta and yellow inks, on a predetermined percentage basis (say, for example, 80 percent) on reflecting white paper that will duplicate as an image on the printing plates the multicolor pattern on object 15 as determined by photocells 27, 30 and 33 in terms of their output voltages X, Y and Z, respectively.

Having selected the printing inks and measured their spectral curves, the circuits of the computer are then designed to provide the following results. A first group of three photographic films 50, 51 and 52 is so selected that each film includes a predetermined number of equal squares arranged in coordinate form. Next, each square of each film is encoded with a first predetermined degree of light transparency as illustrated by the different degrees of shading (i.e., the number of oblique lines) shown in FIGS. 2A, B and C in response to one combination of two preselected coordinate voltages included in a group of three different further voltages varying in predetermined magnitudes. Thus, the respective squares of films 50, 51 and 52 are encoded with predetermined degrees of light transparencies by the further three voltages which correspond to the voltages in the equation:

$$Ye = f_{ye_1}(Y', X') + f_{ye_2}(Y', Z') + f_{ye_3}(X', Z') \qquad (1)$$

where Y*e* is a voltage required to actuate modulator 43 to direct the actinic light from source 40 onto the light-sensitive surface of printing plate 14 in a continuous or a dot form as desired to represent the yellow region of the multicolor light reflected from the light spot 20 on the object 15 at the given moment; voltages $f_{ye_1}$, $f_{ye_2}$ and $f_{ye_3}$ are three two-dimensional components of a three-dimensional function of the voltage Y*e* as represented by the transparency encoded films 50, 51 and 52; and Y′, X′ and Z′ are voltages corresponding to the voltages Y, X and Z, respectively, provided in the photocell outputs.

Then, the films 50, 51 and 52 are so mounted on the screens of cathode-ray tubes 53, 54 and 55, respectively, as to dispose the Y′, X′ and Z′ coordinates to correspond to the photocell output voltages Y, X and Z, applied to the horizontal and vertical deflecting plates of the latter tubes. As shown in FIG. 3, film 50 is held in place on the outer surface of the screen of tube 53 by an opaque member 56 having a central opening and an inner surface to correspond with the curvature of the tube outer face and also having a vertical planar outer surface whereby parallel-ray light is transmitted through the member central opening from the tube screen. Films 51 and 52 are similarly held on the outer surfaces of the screens of tubes 54 and 55 by opaque members 57 and 58, respectively, which are identical in structure with that of member 56. Responsive to the Y, X and Z voltages the respective tubes 53, 54 and 55 transmit parallel-ray light of equal intensities to the films 50, 51 and 52 which then transmit light of varying intensities onto multiplier photo tubes 59, 60 and 61 which translate the latter light into three discrete voltages varying in magnitudes. These voltages combined in adders 62, 63 and 64 are summed in summing amplifier 65 to constitute the voltage $Ye$.

In a similar manner, the respective coordinate squares of photographic films 71, 72 and 73 are encoded with second predetermined degrees of light transparencies in the manner of films 50, 51 and 52 in FIGS. 2A, B and C in response to combinations of two preselected coordinate voltages included in another group of three different further voltages varying in predetermined magnitudes and corresponding to the voltages in the equation:

$$M=f_{m_1}(Y'',X'')+f_{m_2}(Y'',Z'')+f_{m_3}(X'',Z'') \quad (2)$$

where M is the voltage required to actuate modulator 44 to direct actinic light from the sources 41 onto the light-sensitive surface of the printing plate 13 in a continuous or a dot form as desired to represent the magenta region of the multicolor light reflected from the light spot 20 on the object 15 at the given moment; voltages $f_{m_1}$, $f_{m_2}$ and $f_{m_3}$ are three two-dimensional components of a three-dimensional function of the voltage M as represented by the transparency encoded films 71, 72 and 73, respectively; and $Y''$, $X'$ and $Z''$ are voltages corresponding to the Y, X and Z voltages, respectively, provided in the photocell outputs. Then the films 71, 72 and 73 are so mounted on the screens of cathode-ray tubes 74, 75 and 76, respectively, in the manner of FIG. 3 as to dispose $Y''$, $X''$ and $Z''$ coordinates to correspond to the photocell output voltages Y, X and Z applied to the horizontal and vertical deflecting plates of the latter tubes. The films 71, 72 and 73 serve to generate the voltage M varying in magnitude in the output of amplifier 66, in a manner corresponding to the generation of the voltage $Ye$ as above mentioned.

Also in a similar manner, the respective coordinate squares of films 80, 81 and 82 are encoded with third predetermined degrees of light transparencies in the manner of films 50, 51 and 52 in FIGS. 2A, B and C in response to combinations of two preselected coordinate voltages included in a further group of three different magnitudes and corresponding to the voltages in the equation:

$$C=f_{c_1}(Y''',X''')+f_{c_2}(Y''',Z''')+f_{c_3}(X''',Z''') \quad (3)$$

where C is the voltage required to actuate modulator 45 to direct actinic light from the source 42 onto the light-sensitive surface of the printing plate 12 in a continuous or a dot form as desired to represent the cyan region of the multicolor light reflected from the illuminated spot 20 on object 15 at the given moment; voltages $f_{c_1}$, $f_{c_2}$ and $f_{c_3}$ are three two-dimensional components of the voltage C as represented by the transparency encoded films 80, 81 and 82, respectively; and $Y'''$, $X'''$ and $Z'''$ are voltages corresponding to the Y, X and Z voltages, respectively, provided in the photocell outputs. Then, the films 80, 81 and 82 are so affixed to the screens of cathode tubes 83, 84 and 85, respectively, in the manner of FIG. 3 as to dispose the $Y'''$, $X'''$ and $Z'''$ coordinates to correspond to the photocell output voltages Y, X and Z applied to the horizontal and vertical deflecting plates of the latter tubes. The films 80, 81 and 82 serve to generate the voltage C varying in magnitude in the output of amplifier 67, in a manner similar to the generation of the voltage $Ye$ as previously described. A source 79 of regulated voltage activates the cathodes of the respective cathode-ray tubes as above identified to produce initially light beams of equal intensities therein.

The different light intensities thus transmitted through the transparency encoded films 50, 51, 52, 71, 72, 73, 80, 81 and 82 are functions of the voltages Y, X and Z derived from the reflected multicolor light for actuating the horizontal and vertical deflecting plates of the respective cathode-ray tubes. It is apparent that the voltages $Ye$, M and C generated at the same time actuate the light modulators simultaneously to apply the actinic light from the respective light sources onto the light-sensitive surfaces of the printing plates to provide thereon an image of the multicolor pattern via the reflected multicolor light at successively different given time intervals. In this connection, it is understood that mirror 19, mandrel 10 and light sources 40, 41 and 42 together with their associated modulators 43, 44 and 45 are moved in synchronism to produce concurrently a full image of the multicolor pattern of object 15 on printing plates 12 13 and 14 during one 360° rotation of the mandrel. The printing plates exposed to the varying amounts of light in the manner previously described are usable in the printing art in accordance with a familiar procedure.

It is thus apparent that the pairs (XY, ZY, ZX) of translated voltages (X,Y,Z) energizing the horizontal and deflecting plates of the respective tubes 53–55, 74–76 and 83–85 move the electron beams and thereby the beam spots on the associated tube screens in coordinate forms. It is also apparent that the beam spots moving in coordinate forms scan the encoded film squares in turn in corresponding coordinate forms on the films included in the respective film groups 50–52, 71–73 and 80–82 to simultaneously generate the voltages $Ye$, M and C varying in magnitude. These voltages actuate the modulators 43–45 to apply corresponding amounts of actinic light from the sources 40–42 onto the printing inks on the printing plates 12–14 to control the relative amounts of the yellow, magenta and cyan printing inks on the respective printing plates with regard to the predetermined percentage basis (80°) to improve the images of the successively illuminated spots of the object multicolor pattern on the respective printing plate inks as the mandrel is rotated.

In accordance with a specific embodiment of the invention, an optical system 90 is positioned between the object 15 and the light filters 26, 29 and 32, i.e., between the light spot 20 and the latter filters. This system comprises a lens 91 focusing the reflected multicolor light of spot 20 (i.e., the image of the illuminated spot of the multicolor pattern on object 15 at the given moment) onto an aperture 92 formed in an opaque flat member 93. Collimating lens 94 having its focal plane disposed in parallel with a plane of member 93 and receiving the reflected multicolor light from the latter aperture translates the latter light into a beam 96 of parallel-ray light.

The parallel-ray multicolor light beam 96 applied to a first light beam splitter 97 is split thereby onto the above-noted light beam component 25 of multicolor parallel-rays and an additional light beam component 98 of multicolor parallel-rays. The latter component applied to the input of a second light beam splitter 99 is split thereby into the above-mentioned light beam components 28 and 31 of multicolor parallel-rays. It is understood that the optical system is movable in a plane parallel to a plane including the mandrel rotational axis in synchronism with the movements of the mirror, mandrel light sources and modulators. The optical system thus moves in synchronism with the movement of the illuminated spot on the object.

The beam splitters may have, although not particularly required, such spectral characteristics that light rays of different wavelengths will have preferences for different final directions of disposition. In the foregoing explanation, it is apparent that the multicolor pattern and image thereof are on a one-to-one basis. If the multicolor pattern on object 15 is not the same size as the copy to be printed, a step-up or a step-down may be made in the mandrel to change the image ratio in one dimension and the scan rate may be varied to change it in the other. For example, if the original pattern on object 15 was one-half the size of the ultimate copy to be printed, the transparent end of the mandrel supporting the object 15 may be one-half the diameter of the mandrel end holding the printing plates, and the lateral translation of the optical system 90 may be geared down to one-half that of the light modulators. Interchangeable mandrel ends of different diameters may be provided to offer several different imaging ratios. A halftone image may be provided by interposing the familiar contact halftone screens, not shown, between the light modulators 43, 44 and 45, and the printing plates 14, 13 and 12, respectively, in FIG. 1 for operation in the well-known manner.

Writing speeds of the system are limited only by the light sources, which may be a laser of the helium-cadmium type. For example, if an 8½-inch by 10-inch original pattern on object 15 were to be imaged at a resolution of 200 lines per inch and a mandrel rotational speed of 2,000 revolutions per minute, it would require approximately 51 seconds to scan such pattern. This is a substantial improvement in speed over presently competitive techniques which require 2 to 3 hours to scan the same size pattern. This invention is extremely useful in the printing of corporative reports, instruction manuals, and the like wherein speed and cheapness would be factors in the use of several different colors to emphasize preselected charts and illustrations. Also, this invention is similarly useful in low volume color printings (between 50 and 1,000 copies per run) as well as in textile brochures, catalogues and the like where color must be precisely accurate because it is a specific part of a product being delineated. It is additionally most useful in the making of color news-pictures and color advertisements for newspapers.

It is understood that the invention herein is described in specific respects for the purpose of this description. It is also understood that such respects are merely illustrative of the application of the invention, particularly in the area of image ratios which may be a step-up or a stepdown. Numerous other arrangements may be devised by those skilled in the art without departing from the spirit and scope of the invention.

What is claimed is:

1. A high-speed color correcting scanner for multicolor printing, comprising:

a transparent object having a multicolor pattern including a plurality of different colors;

a plurality of printing plates having a number equal to the number of said object different colors; each plate supplied with one of a plurality of different photosensitive printing inks, each containing said object different colors; said different colors having different reflectivities in said respective printing inks whereby uncontrolled relative amounts of said respective inks produce thereon an impaired image of said object multicolor pattern;

a mandrel rotatable on a lengthwise axis in one position and having a hollow one end peripherally supporting said object and an opposite end peripherally supporting said plates; said object and plates disposed end-to-end on said mandrel;

light means linearly movable interiorly of said mandrel one end on said mandrel axis in synchronism with said mandrel rotation for successively illuminating different spots on said object pattern to reflect therefrom multicolor light including said different colors varying in intensity as said mandrel is rotated;

a plurality of photocell means deriving respective different color lights from a plurality of parallel-ray multicolor light beam components of said reflected multicolor light for translation into a plurality of voltages varying in magnitude in correspondence with the varying intensities of said derived respective different color lights; each translated voltage representing one of said object pattern different colors;

a plurality of sources of actinic light, said sources having a number equal to the number of said different colors in said object multicolor pattern;

a plurality of light modulators, each connected to one of said sources; said sources and said modulators connected therewith movable adjacent to said respective plate inks on a common axis separated from and in parallel relationship with said mandrel axis in synchronism with said mandrel rotation;

an analog computer interconnecting said photocell means and said modulators for converting said translated voltages varying in magnitude into a plurality of other voltages varying in magnitude and having a number equal to the number of said translated voltages to control the relative amounts of said respective inks on a predetermined percentage basis on said plates to produce in said printing inks an improved image of said object multicolor pattern, including:

a plurality of cathode-ray tubes, each having a screen provided with an area of light together with horizontal and vertical deflecting elements; said light areas having equal intensities on said screens; said tubes arranged in a number of groups, each containing a number of tubes; said last-mentioned respective numbers being equal to the number of said translated voltages; said deflecting elements of said tubes in said respective tube groups activated by different combinations of two of said translated voltages for moving said light areas in coordinate forms on said screens; and a number of groups of photographic films, each group having a number of films; said last-mentioned respective numbers being equal to the number of said tube groups and the number of tubes in each tube group; each film divided into a number of equal squares arranged in a coordinate form; said squares of each film in each film group encoded with different degrees of light transparencies in relation to different combinations of two voltages in a plurality of different coordinate voltages varying in magnitude and corresponding to said respective translated voltages; said film coordinate voltages of said respective film groups having preselected different relative magnitudes related to said improved image of said multicolor pattern produced in said printing inks, said encoded films of said film groups so mounted on said screens of said tubes in said tube groups, respectively, as to dispose said film two coordinate voltages in correspondence with said two translated voltages activating said deflecting elements of said tubes in said tube groups, whereby said deflecting elements so activated move said light areas in said coordinate forms on said screens to simultaneously scan said film squares in turn in corresponding coordinate forms on said films in said respective film groups for simultaneously generating said other voltages as functions of said film encoded light transparencies of said respective film groups; said other voltages varying in magnitude for activating said modulators to apply corresponding amounts of actinic light from said sources onto said respective printing inks to control the relative amounts thereof with regard to said predetermined percentage basis to improve the images of said successively illuminated different spots of said object multicolor pattern on said respective printing inks as said mandrel is rotated; and optical means interposed between said object and said photocell means and movable linearly on an axis parallel with said mandrel axis and in synchronism with said light means movement and said mandrel rotation for splitting said reflected multicolor light into said parallel-ray multicolor light components at said photocell means.

2. The scanner according to claim 1 in which said optical means comprises:

first light beam splitting means for splitting said reflected multicolor light into first and second of said parallel-ray multicolor light beam components at said photocell means; said first component translated by one of said photocell means into one of said translated voltages; and second light splitting means for splitting said second component into third and fourth parallel-ray multicolor light beam components at said photocell means; said third and fourth components translated by second and third of said photocell means into second and third, respectively, of said translated voltages.

3. The scanner according to claim 1 in which said optical means comprises:

lens means for focusing, said multicolor light reflected from said successively illuminated light spots on said object multicolor pattern onto an aperture formed in an opaque member;

collimating lens means deriving said reflected multicolor light from said aperture for translation into a multicolor parallel-ray light beam;

first light beam splitting means deriving said light beam from said collimating lens for splitting into first and second parallel-ray multicolor light beam components; said first component translated by a first of said photocell means into a first of said translated voltages; and second light beam splitting means deriving said second component from said first light beam splitting means for splitting into third and fourth parallel-ray multicolor light beam components; said third and fourth components utilized by second and third of said photocell means for translation into second and third, respectively, of said translated voltages.

4. The scanner according to claim 1 in which said multicolor pattern on said object and said image on said printing plate inks have a one-to-one relationship in size.

5. The scanner according to claim 1 in which said multicolor pattern on said object and said image on said printing plate inks have a predetermined mutual relationship in size.

6. The scanner according to claim 1 in which said image produced on said printing plate inks is a full tone of said multicolor pattern on said object.

7. The scanner according to claim 1 which includes halftone means interposed between said printing plates and said light sources for causing the production of said image on said printing plate inks as a halftone of said multicolor pattern on said object.

* * * * *